United States Patent
Chretien et al.

(10) Patent No.: US 11,629,708 B2
(45) Date of Patent: Apr. 18, 2023

(54) AUTOMATED PRESSURE CONTROL SYSTEM

(71) Applicant: Halliburton Energy Services, Inc., Houston, TX (US)

(72) Inventors: Alexander Simon Chretien, Duncan, OK (US); Timothy Holiman Hunter, Duncan, OK (US)

(73) Assignee: Halliburton Energy Services, Inc., Houston, TX (US)

(*) Notice: Subject to any disclaimer, the term of this patent is extended or adjusted under 35 U.S.C. 154(b) by 249 days.

(21) Appl. No.: 16/652,329

(22) PCT Filed: Nov. 29, 2017

(86) PCT No.: PCT/US2017/063697
§ 371 (c)(1),
(2) Date: Mar. 30, 2020

(87) PCT Pub. No.: WO2019/108177
PCT Pub. Date: Jun. 6, 2019

(65) Prior Publication Data
US 2020/0232454 A1 Jul. 23, 2020

(51) Int. Cl.
*F04B 23/04* (2006.01)
*F04B 49/06* (2006.01)
(Continued)

(52) U.S. Cl.
CPC ............ *F04B 23/04* (2013.01); *F04B 49/065* (2013.01); *G05D 16/2073* (2013.01);
(Continued)

(58) Field of Classification Search
CPC .... F04B 23/04; F04B 49/065; E21B 43/2607; G05D 16/2073
See application file for complete search history.

(56) References Cited

U.S. PATENT DOCUMENTS 5,365,435 A 11/1994 Stephenson
5,442,562 A 8/1995 Hopkins et al.
(Continued)

FOREIGN PATENT DOCUMENTS

WO 2015/077252 A1 5/2015

OTHER PUBLICATIONS

Office Action issued in related Canadian Application No. 3053107 dated Apr. 8, 2021, 8 pages.
(Continued)

*Primary Examiner* — Charles G Freay
(74) *Attorney, Agent, or Firm* — Conley Rose, P.C.; Rodney B. Carroll

(57) ABSTRACT

To compensate for an event, equipment may require a power down sequence of a motor connected to a pump to prevent the pumping of servicing fluid at a high pressure, high pressure fluid may be required to be diverted to a reservoir or otherwise diverted from a wellhead, multiple pumping systems may require that pumping pressure be altered or adjusted or that flow rate be altered or adjust to manage or control the conditions to protect equipment or personnel at a site. Activating, adjusting or altering an operational characteristic of equipment by using a control system may automatically initiate the most efficient and effective mitigation steps for equipment at a site when condition is detected or predicted. Collecting and analyzing information from devices, components, sensors, control systems, other equipment or any combination thereof at a site by a master control system provides automated control of pressure sensitive conditions.

23 Claims, 4 Drawing Sheets

(51) Int. Cl.
*G05D 16/20* (2006.01)
*E21B 43/26* (2006.01)

(52) U.S. Cl.
CPC ..... *E21B 43/2607* (2020.05); *F04B 2207/041* (2013.01); *F04B 2207/042* (2013.01)

(56) References Cited

U.S. PATENT DOCUMENTS

| | | |
|---|---|---|
| 6,484,816 B1 | 11/2002 | Koederitz |
| 7,574,325 B2 | 8/2009 | Dykstra |
| 7,836,949 B2 | 11/2010 | Dykstra |
| 9,650,871 B2 | 5/2017 | Oehring et al. |
| 10,550,665 B1 * | 2/2020 | Golden ................ F16K 31/041 |
| 2005/0092489 A1 | 5/2005 | Welton et al. |
| 2005/0274517 A1 | 12/2005 | Blauch et al. |
| 2006/0118299 A1 | 6/2006 | Nguyen et al. |
| 2006/0287806 A1 | 12/2006 | Hori |
| 2008/0260540 A1 | 10/2008 | Koehl |
| 2011/0088484 A1 | 4/2011 | Camilleri |
| 2012/0292109 A1 | 11/2012 | Lovorn et al. |
| 2013/0126152 A1 | 5/2013 | Banks et al. |
| 2014/0290964 A1 | 10/2014 | Lovorn et al. |
| 2016/0195082 A1 * | 7/2016 | Wiegman ............... F04B 49/065 417/63 |
| 2016/0281479 A1 | 9/2016 | Rendusara et al. |
| 2017/0204943 A1 * | 7/2017 | Van Hoorn ............. F16H 3/666 |
| 2017/0285668 A1 * | 10/2017 | Moseley ............. F16K 37/0041 |

OTHER PUBLICATIONS

International Search Report and Written Opinion issued in related PCT Application No. PCT/US2017/063697 dated Aug. 21, 2018, 15 pages.

* cited by examiner

AUTOMATED PRESSURE CONTROL SYSTEM

CROSS-REFERENCE TO RELATED APPLICATION

The present application is a U.S. National Stage Application of International Application No. PCT/US2017/063697 filed Nov. 29, 2017, which is incorporated herein by reference in its entirety for all purposes.

TECHNICAL FIELD

The present disclosure relates generally to an automated pressure control system, more particularly, to control and operation of equipment during or in anticipation of an overpressure event.

BACKGROUND

Hydrocarbons, such as oil and gas, are commonly obtained from subterranean formations that may be located onshore or offshore. The development of subterranean operations and the processes involved in removing hydrocarbons from a subterranean formation are complex. Typically, subterranean operations involve a number of different steps such as, for example, drilling a wellbore at a desired well site, treating the wellbore to optimize production of hydrocarbons, and performing the necessary steps to produce and process the hydrocarbons from the subterranean formation.

Several types of equipment, including various valves, pumps, motors, transmissions and manifolds may be used in all phases of well servicing operations including to pump water, cement, fracturing fluids, and other stimulation or servicing fluids as well as other pumping operations. During a well service operation, a condition may occur (for example, an overpressure condition or event) or a test may be desired to be ran that requires a rapid or substantially instantaneous stop, alteration or function of equipment at the site. Different types of equipment require different methods or techniques for altering operation so as not to damage the equipment and not to harm nearby personnel. Traditionally, equipment is controlled by individual controllers that do not have information associated with other equipment at the site. Due to the limited information of the individual controllers, when a condition occurs, the individual controllers may not know of the condition or may implement a mitigation that is not coordinated with the functionality of other equipment at the site, more costly, inefficient, unreliable or not appropriate for the given condition. For example, a mitigation of a condition or event implemented for certain equipment may require the equipment to be rebuilt, reset, replaced, or recertified resulting in delays and additional costs. Thus, an optimized mitigation is needed to maintain efficient and effective operation of equipment at a site.

FIGURES

Some specific exemplary embodiments of the disclosure may be understood by referring, in part, to the following description and the accompanying drawings.

Figure 1:
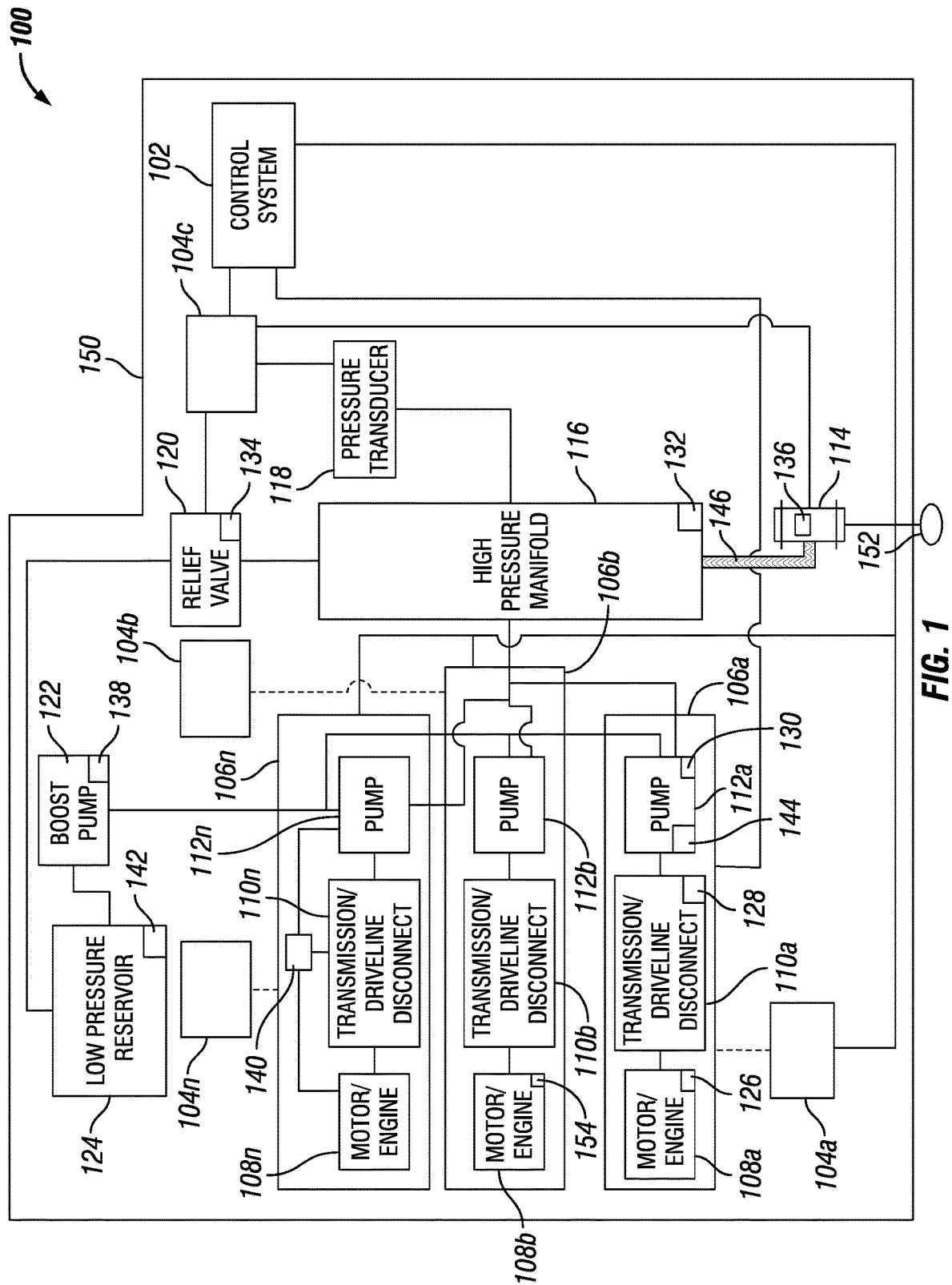
FIG. 1 is a diagram illustrating an automated pressure control system for a site, according to one or more aspects of the present disclosure.

While embodiments of this disclosure have been depicted and described and are defined by reference to exemplary embodiments of the disclosure, such references do not imply a limitation on the disclosure, and no such limitation is to be inferred. The subject matter disclosed is capable of considerable modification, alteration, and equivalents in form and function, as will occur to those skilled in the pertinent art and having the benefit of this disclosure. The depicted and described embodiments of this disclosure are examples only, and not exhaustive of the scope of the disclosure.

DETAILED DESCRIPTION

The present disclosure relates generally to an automated pressure control system, more particularly, to control and operation of equipment during or in anticipation of a triggering event or condition, for example an overpressure event. Generally, several types of engines may be used to drive one or more types of pumps for pumping a fluid at a pressure at a site. For example, during hydrocarbon recovery, one or more engines and pumps may be used to pump a fluid downhole for a stimulation operation at a well site. The same types of engines and pumps may be used or any combination of types of engines and pumps may be used according to a configuration and operation at a particular site. Conditions at a site may require that any one or more pumps or engines be stopped immediately or substantially instantaneously to prevent damage to the pump, the motor or powertrain driving the pump, and surrounding equipment or environment, that a valve be opened or closed, that fluid be diverted to a reservoir or container, that an operation or function of any other equipment be altered or adjusted or any combination thereof. For example, a triggering event, such as an overpressure condition, may occur or be anticipated or an operator may require that one or more tests be ran. With a diesel engine, the clutch could be disengaged from the transmission, or the transmission shifted to neutral, stopping substantially instantaneously the driving of the pump. However, diesel engines may not be suitable for a given well site environment due to operational parameters or characteristics of the diesel engine, for example, control over pump rate, exhaust emissions and noise emissions. An electric motor or powertrain may provide the operational parameters or characteristics required for a given well site environment. However, electric motors or powertrains comprise a rotor that may have substantial inertia that is not easily stopped or ceased during operation without causing damage to the equipment. Each group of motors, transmissions, driveline disconnects, pumps or other equipment may be controlled by an individual controller such that each group reacts to a condition independent of other groups. In some instances, such independent control may not provide the most efficient, inexpensive, effective, reliable and acceptable mitigation of a condition. One or more aspects of the present disclosure provide for controlling the equipment at a site based on information from one or more groups or individual components and equipment to provide a coordinated and site-based approach to mitigation of a condition, such as an overpressure condition or an anticipation of an overpressure condition.

In one or more aspects of the present disclosure, an operation at a site may utilize an information handling system to control one or more operations including, but not limited to, a motor or powertrain, one or more valves, one or more disconnects, one or more transducers, a wellhead, a downstream pressurized fluid system, or any combination thereof. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components. The information handling system may also include one or more interface units capable of transmitting one or more signals to a controller, actuator, or like device.

For the purposes of this disclosure, computer-readable media may include any instrumentality or aggregation of instrumentalities that may retain data and/or instructions for a period of time. Computer-readable media may include, for example, without limitation, storage media such as a direct access storage device (for example, a hard disk drive or floppy disk drive), a sequential access storage device (for example, a tape disk drive), compact disk, CD-ROM, DVD, RAM, ROM, electrically erasable programmable read-only memory (EEPROM), and/or flash memory, as well as communications media such wires, optical fibers, microwaves, radio waves, and other electromagnetic and/or optical carriers, and/or any combination of the foregoing.

Illustrative embodiments of the present disclosure are described in detail herein. In the interest of clarity, not all features of an actual implementation may be described in this specification. It will of course be appreciated that in the development of any such actual embodiment, numerous implementation-specific decisions must be made to achieve the specific implementation goals, which will vary from one implementation to another. Moreover, it will be appreciated that such a development effort might be complex and time-consuming, but would nevertheless be a routine undertaking for those of ordinary skill in the art having the benefit of the present disclosure.

Throughout this disclosure, a reference numeral followed by an alphabetical character refers to a specific instance of an element and the reference numeral alone refers to the element generically or collectively. Thus, as an example (not shown in the drawings), widget "1a" refers to an instance of a widget class and widget "1n" refers to an nth instance of a widget class where "n" represent any number of widgets, which may be referred to collectively as widgets "1" and any one of which may be referred to generically as a widget "1". In the figures and the description, like numerals are intended to represent like elements.

To facilitate a better understanding of the present disclosure, the following examples of certain embodiments are given. In no way should the following examples be read to limit, or define, the scope of the disclosure. Embodiments of the present disclosure may be applicable to drilling operations that include but are not limited to target (such as an adjacent well) following, target intersecting, target locating, well twinning such as in SAGD (steam assist gravity drainage) well structures, drilling relief wells for blowout wells, river crossings, construction tunneling, as well as horizontal, vertical, deviated, multilateral, u-tube connection, intersection, bypass (drill around a mid-depth stuck fish and back into the well below), or otherwise nonlinear wellbores in any type of subterranean formation. Embodiments may be applicable to injection wells, and production wells, including natural resource production wells such as hydrogen sulfide, hydrocarbons or geothermal wells; as well as borehole construction for river crossing tunneling and other such tunneling boreholes for near surface construction purposes or borehole u-tube pipelines used for the transportation of fluids such as hydrocarbons. Embodiments described below with respect to one implementation are not intended to be limiting.

FIG. 1 is a diagram illustrating an automated pressure control system 150 for a site, for example, well environment 100, according to one or more aspects of the present disclosure. While FIG. 1 relates to a well environment 100, any one or more components of automated pressure control system 150 may be implemented at a site that requires pumping of a fluid 146 under pressure to a wellhead 114 associated with a borehole 152. For example, a fluid 146 may be a well services fluid including, but not limited to a fluid, a solid, a gas or any combination thereof. For example, a fluid 146 may comprise a stimulation fluid, a sand, a treatment fluid, water, a slurry, a composite, a mixture or any suitable combination thereof. While FIG. 1 illustrates an automated pumping control system 150, any one or more automated pumping control systems 150 may be implemented or configured at well environment 100.

Figure 2:
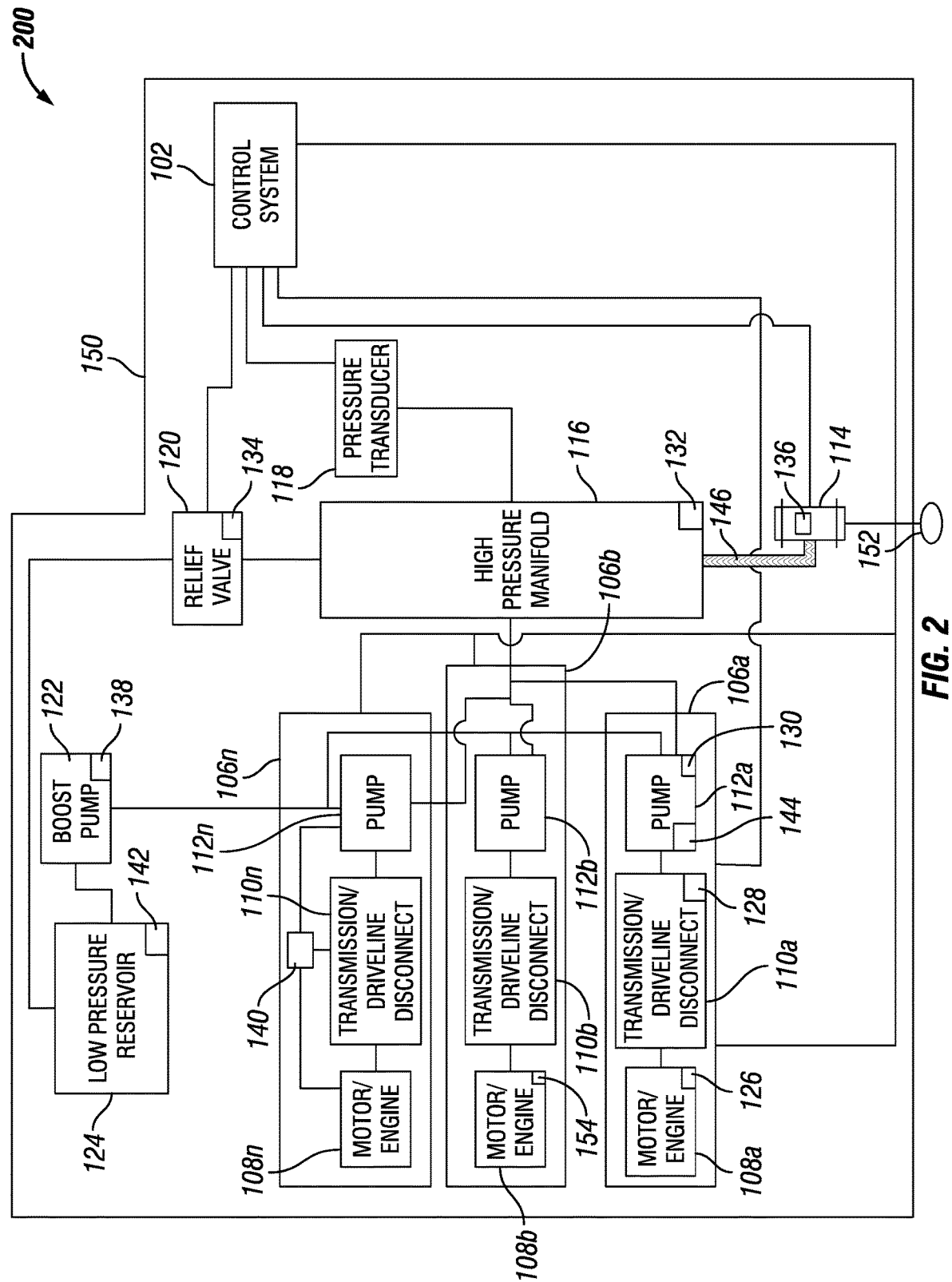
FIG. 2 is a diagram illustrating an automated pressure control system for a site, according to one or more aspects of the present disclosure.

In one or more embodiments, an automated pumping control system 150 may comprise a master control system 102 and one or more control systems 104. The master control system 102 may comprise any one or more information handling systems, for example, one or more control systems 104. In one or more embodiments, each of the one or more controls systems 104 may comprise one or more information handling systems, such as one or more control systems 104 or a master control system 102. For example, in one or more embodiments, the master control system 102 comprises the one or more control systems 104 and thus any one or more elements or equipment illustrated in FIG. 1 as coupled directly or indirectly to the one or more control systems 104 may be coupled directly or indirectly to master control system 102 as illustrated in FIG. 2. In one or more embodiments control system 102, control system 104 or any combination thereof may comprise an information handling system, such as information handling system 500 of FIG. 5, or any other computer device.

In one or more embodiments, the automated pumping control system 150 comprises one or more pumping systems 106, for example, pumping systems 106a, 106b and 106n. Each pumping systems 106 may comprise any one or more motors or engines 108, one or more transmissions or driveline disconnects 110 and one or more pumps 112. For example, pumping system 106a may comprise one or more motors or engines 108a, one or more transmissions or driveline disconnects 110a and one or more pumps 112a and pumping system 106b may comprise one or more motors or engines 108b, one or more rotors 154 of motor or engine 108b, one or more transmissions or driveline disconnects 110b and one or more pumps 112b and pumping system 106n may comprise one or more motors or engines 108n, one or more transmissions or driveline disconnects 110n and one or more pumps 112n. A motor or engine 108 may drive or actuate a pump 112, for example, via a transmission or driveline disconnect 110, to pump fluid 146 to wellhead 114. Each pumping system 106 may communicatively couple via a wired or wireless connection or directly or indirectly to a control system 104. For example, pumping system 106a may communicatively couple to control system 104a, pumping system 106b may communicatively couple to control system 104b and pumping system 106n may communicatively couple to control system 104n. In one or more embodiments, any combination of pumping systems 106 may be communicatively coupled to any one or more control systems 104. In one or more embodiments, the motor 108 may comprise an electric motor, a diesel engine, natural gas engine, hydraulic motor, a turbine or any other type of motor. In one or more embodiments, the pumping system 106 may comprise a positive displacement pump, a hydraulic pump, centrifugal pump or any other type of pump. In one or more embodiments, the transmission or driveline disconnect 110 may comprise a releasable coupling, shearable coupling, torque-limiting coupling, transmission neutral position, or any other type of transmission or driveline disconnect.

In one or more embodiments, any one or more motors 108 may comprise a sensor, for example, motor 108a may comprise a sensor 126, any one or more transmission or driveline disconnects 110 may comprise a sensor, for example, sensor 128 and any one or more pumps 112 may comprise a sensor, for example sensor 130. In one or more embodiments, a pumping system 106 may comprise a sensor that couples to any one or more components of the pumping system 106, for example, pumping system 106n may comprise a sensor 140 that couples to motor or engine 108, transmission or driveline disconnect 110n, pump 112n or any combination thereof. In one or more embodiments, any one or more sensors 126, 128, 130 and 140 may couple to any one or more motors or engines 108, one or more transmissions or driveline disconnects, one or more pumps 112, one or more pumping systems 106 or any combination thereof. Sensors 126, 128, 130, and 140 may sense one or more operational parameters or characteristics of the respective equipment, communicate one or more measurements or information associated with the operational parameters or characteristics of the respective equipment, or both to a control system 104. Any one or more sensors 126, 128, 130 and 140 may communicatively couple to control system 104 via a wired or wireless connection or directly or indirectly. The control system 104 may control one or more operational parameters or characteristics of motor or engine 108, transmission or driveline disconnect 110, pump 112, pumping system 106 or any combination thereof based, at least in part, on one or more measurements or information received from one or more sensors 126, 128, 130 and 140. For example, the control system 104 may control one or more operational parameters or characteristics of the motor 108 (for example, speed, torque, voltage, current, temperature, acceleration, deceleration, or any other parameters or characteristics), one or more operational parameters or characteristics of the transmission or driveline disconnect 110 (for example, application of clutches, range selection, temperature, torque converter lock-up or any other operational parameters or characteristics), one or more operational parameters or characteristics of the pump 112 (for example, discharge rate, pressure, valve operation or any other operational parameters or characteristics), one or more operational parameters or characteristics of the pump system 106 or any combination thereof. In one or more embodiments, any one or more control systems 104 may be communicatively coupled to any one or more control systems 104 and may be communicatively coupled to one or more different components of pumping system 106. In one or more embodiments, control system 104 may be located remotely from, proximate to or at any suitable location with respect to any one or more pumping systems 106 or automated pressure control system 150.

Any one or more pumping systems 106 may be coupled to one or more high pressure manifolds 116. High pressure manifold 116 may be coupled to a relief valve 120, a pressure transducer 118 and to a wellhead 114. Each high pressure manifold 116, relief valve 120 and wellhead 114 may comprise one or more sensors 132, 134 and 136, respectively. Any one or more pumping systems 106 may also be coupled to a boost pump 122 and boost pump 122 may be coupled to a low pressure reservoir 124. Each of the boost pump 122 and low pressure reservoir 124 may comprise one or more sensors 138 and 142, respectively. In one or more embodiments, any one or more of the high pressure manifold 116, pressure transducer 118, wellhead 114, control system 104, relief valve 120, boost pump 122, low pressure reservoir 124 may be communicatively coupled wired or wirelessly or directly or indirectly to a master control system 102. In one or more embodiments, any one or more sensors 132, 134 and 136 may communicatively couple to a control system 104, for example, control system 104c, via a wired or wireless connection or directly or indirectly. The master control system 102 may control one or more operational parameters or characteristics of a motor or engine 108, a transmission or driveline disconnect 110, a pump 112, a pumping system 106, a pressure transducer 118, a manifold 116, a relief valve 120, a wellhead 114 or any combination thereof based, at least in part, on one or more measurements or information received from any one or more sensors 126, 128, 130, 132, 134, 136, 138, 140, 142, 144, pressure transducer 118. In one or more embodiments, any one or more of sensors 126, 128, 130, 132, 134, 136, 138, 140, 142 and 144 may be communicatively coupled to master control system 102 either directly or indirectly and wired or wirelessly. For example, pumping system 106a may be communicatively coupled directly to master control system 102, indirectly to master control system 102 via control system 104a or both.

Master control system 102, control system 104 or both may comprise hardware, software or any combination thereof to process, analyze, store or any combination thereof any information received from any one or more sources, for example, any one or more of sensors, devices, components or equipment, for example, as discussed above and illustrated in FIG. 1 at well environment 100 or any other site. Master control system 102 may control one or more operational parameters or characteristics of any one or more sensors, devices, components or equipment, for example, as discussed above and illustrated in FIG. 1, based, at least in part, on the information received. For example, in one or more embodiments, any one or more control systems 104 or master control system 102 may receive information or one or more measurements from any one or more sources including, but not limited to, any one or more sensors 126, 128, 130, 132, 134, 136, 138, 140, 142 and 144, one or more control systems 104, one or more engines or motors 108, one or more transmissions or driveline disconnects 110, one or more pumping systems 106, pressure transducer 118, relief valve 120, wellhead 114, high pressure manifold 116, boost pump 122, low pressure reservoir 124, any other component, equipment or device at well environment 100 or any combination thereof. The information received by the master control system 102 from any source may comprise any one or more operational parameters or characteristics of associated sensors, devices, components or equipment, for example, any one or more of pump pressure, discharge rate, and valve operation associated with one or more pumps 112 or any other operational parameter or characteristic), engine speed associated with one or more motors or engines 108, gear range, temperature, rotational speed torque converter lock-up state, clutch application state, torque and disconnect condition associated with transmission or driveline disconnect 110, pressure associated with pressure transducer 118, set condition or state associated with relief valve 120, pressure, flow rate and valve position associated with wellhead 114, pressure, flow rate and valve position associated with high pressure manifold 116, rotational speed, inlet pressure and discharge pressure associated with boost pump 122, fluid temperature, pressure and fluid volume associated with low pressure reservoir 124 or any other information associated with any other component, equipment or device at well environment 100, or any combination thereof. Based, at least in part, on information received, the master control system 102 may determine that a triggering event or condition, for example, an overpressure event, has occurred, is about to or anticipated to occur, may occur or any combination thereof. For example, the master control system 102 may compare or otherwise analyze information received to determine if a threshold for an event, such as an overpressure event, has been reached or exceeded, an overpressure event falls below or is at a threshold, any other condition has been met or any combination thereof.

The master control system 102 may also assess or determine the total energy of each component, device or equipment at a site or well environment, including, but not limited to, parameters of present energy (for example, pressurized fluid and kinetic energy) and connected energy input device (for example, engines, motors and pressure sources). This energy assessment or determination may then be used to select and execute a response or mitigation step to prevent or mitigate one or more undesirable events, such as, an overpressure event. The mitigation step or response may be based, at least in part, on current state and projected conditions (for example, based, at least in part, on data and related trends gathered from the devices, components and equipment at the site or well environment).

In one or more embodiments, the master control system 102 may transmit or otherwise communicate a control signal to any one or more of sensors, devices, components or equipment, for example, as discussed above and illustrated in FIG. 1, based at least in part on the above analysis. For example, the master control system 102 may transmit or communicate a control signal to one or more engines or motors 108, one or more transmissions or driveline disconnects 110, one or more pumping systems 106, pressure transducer 118, relief valve 120, wellhead 114, high pressure manifold 116, boost pump 122, low pressure reservoir 124, any other component, equipment or device at well environment 100 or any combination thereof to alter or adjust one or more operational parameters or characteristics including, but not limited to, adjusting or altering any one or more operation parameters thereof, for example, the operational parameters discussed above.

FIG. 2 is a diagram illustrating an automated pressure control system 150 for a site, for example, well environment 200, according to one or more aspects of the present disclosure. The discussion of FIG. 1 applies likewise to FIG. 2 except instead of one or more control systems 104 communicatively coupled to a master control system 102, only a master control system 102 is illustrated. In one or more embodiments, master control system 102 comprises one or more control systems 104, one or more master control systems 102 or any combination thereof.

Figure 3:
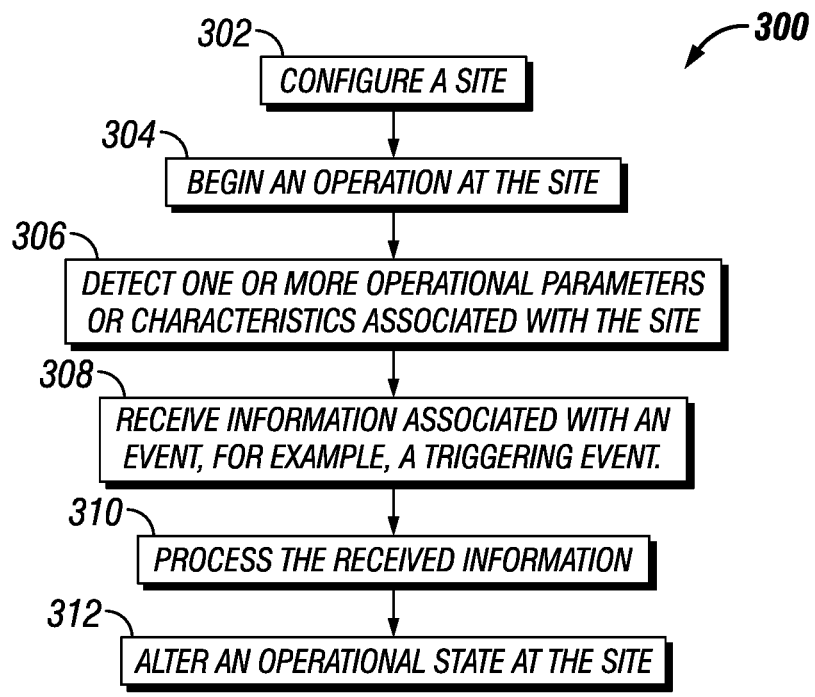
FIG. 3 is a flowchart of a method for automated pressure control of a system, according to one or more aspects of the present disclosure.

FIG. 3 is a flowchart 300 of a method for automated pressure control of a system according to one or more aspect of the present disclosure. During one or more well servicing operations or other types of operations, it may be necessary, required or part of a job plan or workflow to monitor, maintain, adjust, alter, or otherwise control the pressure of fluid of a system or a configuration of equipment, for example, equipment at a well environment 100 as illustrated in FIG. 1. Certain events, triggering events or conditions, such as an overpressure event, may require immediate, instantaneous or methodical actions or responses, for example, one or more mitigation steps, to prevent or mitigate damage or destruction of equipment or harm to personnel.

In one or more embodiments, at step 302 a site is configured, for example, well environment 100 of FIG. 1, according to one or more criteria, a workflow, a job plan or any combination thereof. Configuration of the site may require that equipment, one or more sensors associated with the equipment, or both be coupled to one or more control systems, for example, coupled to control system 104, master control system 102, or both as illustrated in and discussed with respect to FIG. 1. The site may be configured in any manner to meet the needs and requirements of a specific job. Configuration of the site may also include setting one or more thresholds associated with one or more operational parameters associated with one or more components, devices or equipment at the site. A threshold may be associated with an event, for example, an overpressure event. In one or more embodiments, a threshold may be based, at least in part, on any one or more threshold parameters or models. The one or more threshold parameters may include, but are not limited to, a configuration of the system at a site, for example, well environments 100 and 200 of FIG. 1 and FIG. 2, respectively, a fluid pressure, a performance rating, a pressure rating, state or health, altitude, temperature, age, wear, or any other characteristic or operational parameter associated with a component, device or equipment at a site. For example, a sensor associated with a braking system may sense temperature associated with the braking system of a motor or engine, for example, motor or engine 108, such that the braking system is only allowed to be activated when the temperature is below a specified temperature or threshold. The one or more models may comprise models that relate to pressure, energy, or any other operational parameter or characteristic. For example, one or more models may comprise a graphical representation of pressure where the shape of the pressure curve may be used to anticipate peak pressure, time to peak pressure, time to incrementally decrease pressure, any other pressure characteristic or combination thereof.

At step 304, the operation of the site may begin. For example, any one or more pumps may be actuated to begin pumping a fluid to a wellhead as illustrated in and discussed with respect to FIG. 1 and FIG. 2. Any one or more alarms or triggers associated with a threshold may be reset, preset or otherwise initialized. In one or more embodiments, at start-up one or more start-up thresholds may be utilized while once the configuration is operational, one or more run-time thresholds may be utilized. For example, at start-up a motor or engine may operate using a first current or first power which is reduced to a second current or second power once the motor or engine has reached the required operational state, for example, a maximum efficiency state.

At step 306, one or more sensors, one or more components, devices or equipment at the site or both detect one or more operational parameters or characteristics associated with the site, for example, associated with one or more components, devices or equipment as discussed above with respect to FIG. 1. For example, a pump 112 or a sensor 144 of a pump 112 may detect an operational parameter of the pump 112 and communicate that information to control system 104 or master control system 102 (as illustrated in FIG. 1 and FIG. 2).

At step 308, information associated with an event, a triggering event or condition, for example, an overpressure event, is received. For example, the detected one or more operational parameters or characteristics from step 306 associated with the operation of the components, devices, equipment or any combination thereof may be received at a control system 104, master control system 102 or both as illustrated in FIG. 1 and FIG. 2. This information may be received from any one or more sensors, the one or more components, devices, equipment or any combination thereof either directly or indirectly, wired or wirelessly or any combination thereof.

At step 310, the information is processed. In one or more embodiments, the information from step 308 received at one or more control systems 104 may be communicated to a master control system 102 for processing as illustrated in FIG. 1 and FIG. 2. In one or more embodiments, the information from step 308 received at one or more information handling systems, such as control systems 102, master control systems 104, or both, may be processed at the one or more information handling systems. In one or more embodiments, the information received from step 308 at an information handling system is processed at the master control system 102 as illustrated in FIG. 2. The information may be processed to determine that an event, triggering event or condition has occurred, is about or anticipated to occur, a prediction, likelihood or probability of occurrence or any combination thereof.

At step 312, one or more conditions or operational states of any one or more of components, devices, or equipment at a site are altered, adjusted, maintained or otherwise controlled based, at least in part, on the information processed at step 310. For example, any one or more operational parameters or characteristics as discussed above may be altered, adjusted, maintained, changed or otherwise controlled to effectuate mitigation of the event, triggering event or condition by, for example, altering, adjusting, maintaining or otherwise controlling any one or more the components, devices, or equipment at site, such as well environment 100 of FIG. 1 and well environment 200 of FIG. 2.

Figure 4:
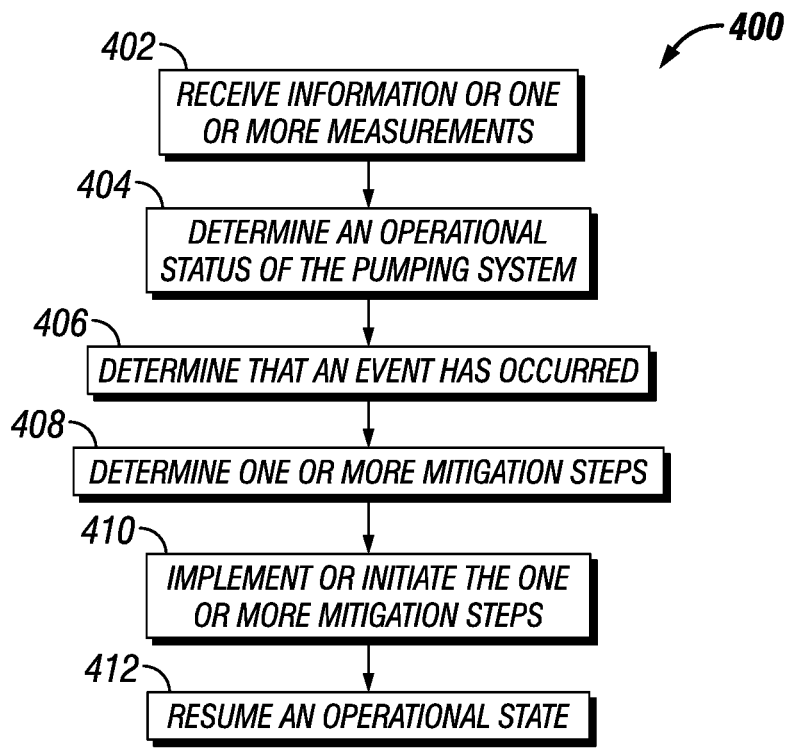
FIG. 4 is a flowchart of a method for automated pressure control of a system, according to one or more aspects of the present disclosure.

FIG. 4 is a flowchart 400 of a method for automated pressure control of a system, according to one or more aspects of the present disclosure. At step 402, information or one or more measurements are received from one or more sensors, components, devices, equipment or any combination thereof for a pumping system 106 at a site as discussed with respect to step 308 of FIG. 3 and illustrated in and discussed with respect to FIG. 1 and FIG. 2.

At step 404, an operational status of the pumping system 106 is determined. For example, an operational status may comprise a rate of change of the fluid pressure in the pumping system 106, an energy consumption level, a rate of change in kinetic energy or any combination thereof. For example, the rate of change of the fluid pressure in the pumping system 106, for example, automated pressure control system 100 or 200 of FIG. 1 and FIG. 2, respectively, and kinetic energy may be calculated based, at least in part, on any one or more of inertial mass and velocity of any one or more of the components, devices, equipment, or any combination thereof of automated pressure control system 100 or 200 of FIG. 1 and FIG. 2, respectively, volume of fluid, for example, volume of fluid 146, pressure of fluid, for example, fluid 146, compressibility of fluid, for example, compressibility of fluid 146, fluid velocity, for example, fluid velocity of fluid 146, one or more wellhead characteristics, for example wellhead characteristics associated with wellhead 114, one or more borehole characteristics (such as depth, pipe size, and orientation), for example, borehole characteristics associated with borehole 152, pipe length, for example, pipe length of automated pumping control system 150, any other characteristic or parameter associated with the site or automated pumping control system 150, and any combination thereof.

The inertial mass and rotational speed may be indicative of energy stored by the motor or engine 108, the transmission or driveline disconnect 110, the pump 112, presser transducer 118, gears, gear reducer, couplings, or any other component, device, or equipment at the site. The angular velocity may be related to the one or more inertial masses and velocity of any one or more components, devices, equipment or any combination thereof of the site. The volume of fluid in combination with the compressibility of fluid is indicative of the increase or decrease in pressure or the rate thereof necessary to mitigate an event, such as an overpressure event. One or more borehole characteristics may comprise resistance of the borehole, for example, borehole 152, to receive a fluid, for example, fluid 146. One or more wellhead characteristics may comprise any one or more of pressure, bore diameter, conduit length, pressure rating and valve position.

At step 406, an event, such as a triggering event, is determined to have occurred. In one or more embodiments, an overpressure event is determined. Determining an event, a triggering event or a condition may comprise determining that an event has occurred, is about to or is anticipated to occur, may occur or any combination thereof. In one or more embodiments, the event may be determined based, at least in part, on a comparison of operational status to a threshold. In one or more embodiments, an overpressure event may be determined based, at least in part, on the calculated rate of change of fluid pressure compared to a threshold associated with an overpressure event. The threshold associated with the overpressure event may be set as discussed with respect to step 302 of FIG. 3. For example, the threshold may be based, at least in part, on any one or more threshold parameters or one or more models. In one or more embodiments, an overpressure event may be anticipated or determined to have occurred based, at least in part, on the calculated rate of change of fluid pressure exceeding, being equal, or both to a threshold associated with an overpressure event.

At step 408 once an event is determined, one or more mitigation steps are or a response is determined to mitigate the event. For example, one or more parameters related to rate of change and assessed energy (including kinetic energy) may be correlated to determine an energy balance with respect to time that may be used to determine a least disruptive response or mitigation step. In one or more embodiments, one or more mitigation steps may require selectively altering one or more operational states of one or more components, devices or equipment at the site, for example, sites 100 or 200 of FIG. 1 and FIG. 2, respectively. For example, the operational state of one or more pumping systems 106 at a site may be selectively altered based on the event and mitigation step. In one or more embodiments, one or more mitigation steps may require selectively altering a characteristic of the fluid in the system, for example, fluid 146 of FIG. 1, a speed of a motor or engine 108 be increased or decreased, an energy of the system be increased or decreased, activation or deactivation of one or more components, devices or equipment, any other mitigation step, a cost associated with each mitigation step or any combination thereof.

In one or more embodiments, altering or changing an operational state as part of a mitigation step may require any one or more of increasing or decreasing the energy stored in the inertia of a rotor of a motor or engine, for example, energy stored in a rotor may be dissipated, for example, the energy stored in rotor 154 of motor or engine 108b of FIG. 1, reducing or increasing the inertia of a pump or altering the output capability (for example, fluid discharge rate) of the pump, for example a pump 112 of FIG. 1, or both. In one or more embodiments, altering or changing an operational state associated with a mitigation step may require any one or more of altering or changing a characteristic of a fluid, for example fluid 146, by increasing or decreasing the pressure of the fluid, increasing or decreasing a volume of the fluid, for example, increasing or decreasing a flow rate of the fluid, diverting or altering a flow path of the fluid, or both.

In one or more embodiments, altering or changing an operational state associated with a mitigation step may require any one or more of a power down sequence that stops, brakes, or ramps down the speed of a motor or engine 108, for example, an electric motor, gradually to prevent damage to the electric motor, other equipment or the surrounding environment. However, during this power down sequence (which generally is not an instantaneous or substantially instantaneous power stoppage of the motor 108) the pump 112 may continue pumping due to kinetic energy in the motor or engine 108. One or more control valves, for example, one or more control valves 144 may be activated to prevent or throttle the pressurized fluid 146 from being pumped by pump 112 to the wellhead 114 during such a power down sequence of the motor or engine 108.

In one or more embodiments, an altering or changing operational state associated with a mitigation step may require that the master control system 102 initiate a pumping sequence to prevent or throttle the flow of pressurized fluid 146 from the pumping system 106 based, at least in part, an information from any one or more of one or more pumping systems 106, one or more sensors 126, 128, 130, 132, 134, 136, 138, 140 and 142. For example, in one or more embodiments, the master control system 102 may initiate a pumping sequence based, at least in part, on any one or more of a detection of a power down sequence of the motor or engine 108 (for example, information from sensor 126 may be indicative of a power down sequence of the motor or engine 108), one or more operator inputs, information from sensor 126 (for example, information from sensor 126 may be indicative of an overpressure condition), a flag, alert, semaphore, program instruction or timed interval (for example, testing procedures may be scheduled), or any other indicator. In one or more embodiments, the master control system 102 may be coupled to pumping system 106 and may send a signal or command to the motor or engine 108 to initiate a power down sequence.

In one or more embodiments, altering or changing an operational state associated with a mitigation step may require any one or more of opening or closing a pressure release valve, for example, relief valve 120, engaging or disengaging a transmission or driveline disconnect 110, disable the output of the pump, divert flow of a fluid 146, or any combination thereof. In one or more embodiments, diverting flow of a fluid 146 may require opening relief valve 120 so that fluid 146 flows to a low pressure reservoir 124, reducing rate of pumping from one or more pumping systems 106, introducing an additional one or more pumping systems 106, for example, activating or initiating an additional pumping system 106, or any combination thereof.

At step 410, the event, triggering event or condition is mitigated by implementing or initiating one or more mitigation steps. As each of the one or more mitigation steps are implemented, the master control system or any one or more control systems, such as master control system 102 and control system 104 of FIG. 1 and FIG. 2, continuously implement any one or more of steps 402-406 such that at any point in time the one or more mitigation steps currently being implemented are changed, altered or adjusted based on up to date or real-time information. For example, any one or more sensors or devices, components or equipment may provide information or feedback to the one or more control systems 104 and the master control system 102 on a real-time, automatic, or both bases such that any one or more mitigation steps are based on up to date or current operational status at the site.

At step 412, any one or more operational states of the pumping system 106 or any one or more other components, devices or equipment at the site may be resumed. For example, once an event, triggering event or condition, such as an overpressure event, has been mitigated, the master control system 102, one or more control system 104 or both may send a signal to a selected pumping system 106 for the pumping system 106 to resume the operational state of the pumping 106 that existed prior to the overpressure event or the initiation of the mitigation step.

In certain embodiments, the master control system 102, the control system 104 or both may comprise an information handling system with at least a processor and a memory device coupled to the processor that contains a set of instructions that when executed cause the processor to perform certain actions. In any embodiment, the information handling system may include a non-transitory computer readable medium that stores one or more instructions where the one or more instructions when executed cause the processor to perform certain actions. As used herein, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a computer terminal, a network storage device, or any other suitable device and may vary in size, shape, performance, functionality, and price. The information handling system may include random access memory (RAM), one or more processing resources such as a central processing unit (CPU) or hardware or software control logic, read only memory (ROM), and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 5:
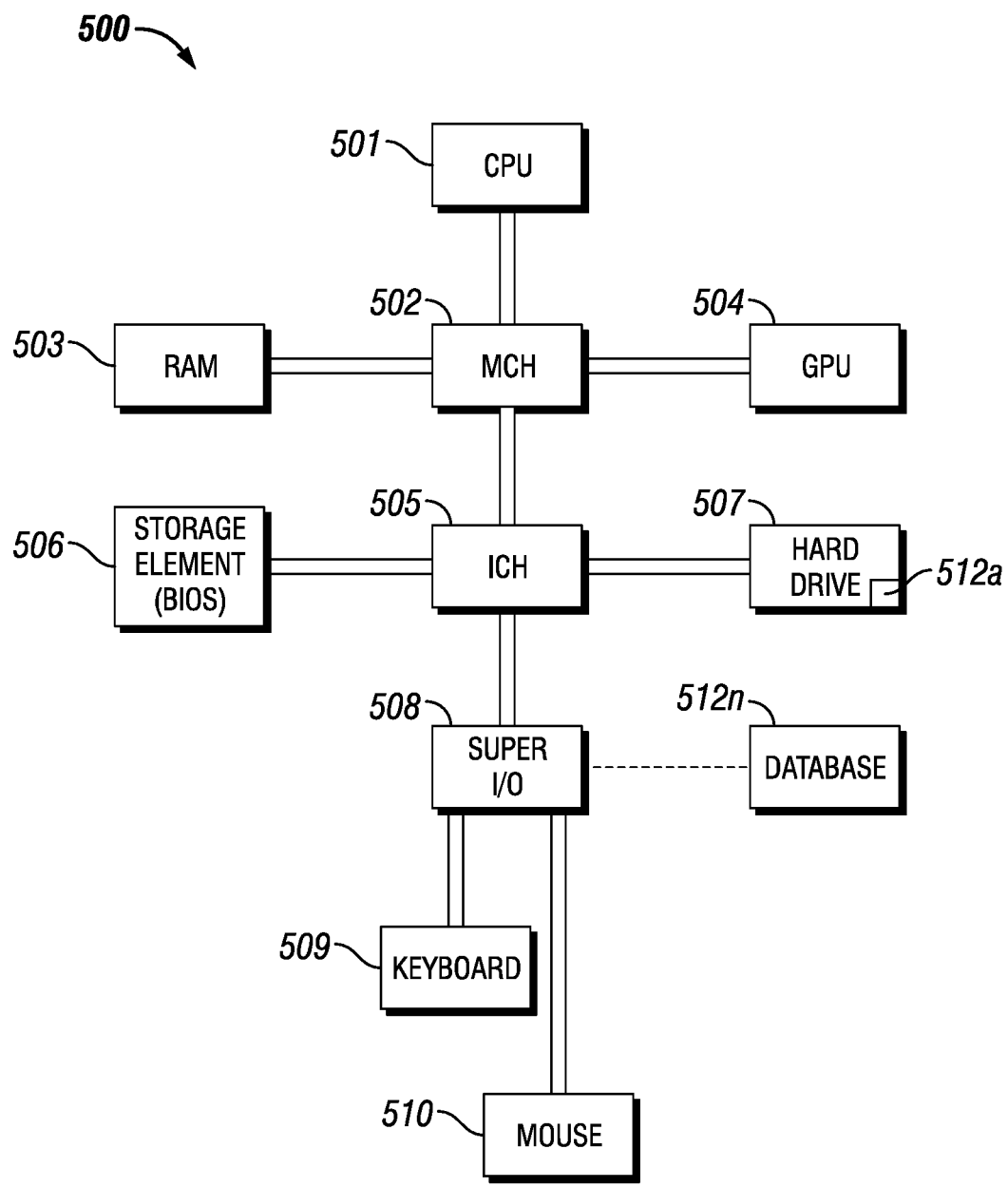
FIG. 5 is a diagram illustrating an example information handling system, according to aspects of the present disclosure.

FIG. 5 is a diagram illustrating an example information handling system 500, according to aspects of the present disclosure. The master control system 102, control system 104 or both may take a form similar to the information handling system 500. A processor or central processing unit (CPU) 501 of the information handling system 500 is communicatively coupled to a memory controller hub or north bridge 502. The processor 501 may include, for example a microprocessor, microcontroller, digital signal processor (DSP), application specific integrated circuit (ASIC), or any other digital or analog circuitry configured to interpret and/or execute program instructions and/or process data. Processor 501 may be configured to interpret and/or execute program instructions or other data retrieved and stored in any memory such as memory 403 or hard drive 407. Program instructions or other data may constitute portions of a software or application for carrying out one or more methods described herein. Memory 403 may include read-only memory (ROM), random access memory (RAM), solid state memory, or disk-based memory. Each memory module may include any system, device or apparatus configured to retain program instructions and/or data for a period of time (for example, computer-readable non-transitory media). For example, instructions from a software program or an application may be retrieved and stored in memory 403 for execution by processor 501.

Modifications, additions, or omissions may be made to FIG. 5 without departing from the scope of the present disclosure. For example, FIG. 5 shows a particular configuration of components of information handling system 500. However, any suitable configurations of components may be used. For example, components of information handling system 500 may be implemented either as physical or logical components. Furthermore, in some embodiments, functionality associated with components of information handling system 500 may be implemented in special purpose circuits or components. In other embodiments, functionality associated with components of information handling system 500 may be implemented in configurable general purpose circuit or components. For example, components of information handling system 500 may be implemented by configured computer program instructions.

Memory controller hub (MCH) 502 may include a memory controller for directing information to or from various system memory components within the information handling system 500, such as memory 503, storage element 506, and hard drive 507. The memory controller hub 502 may be coupled to memory 503 and a graphics processing unit 504. Memory controller hub 502 may also be coupled to an I/O controller hub (ICH) or south bridge 505. I/O hub 505 is coupled to storage elements of the information handling system 500, including a storage element 506, which may comprise a flash ROM that includes a basic input/output system (BIOS) of the computer system. I/O hub 505 is also coupled to the hard drive 507 of the information handling system 500. I/O hub 505 may also be coupled to a Super I/O chip 508, which is itself coupled to several of the I/O ports of the information handling system, including keyboard 509 and mouse 510. In one or more embodiments, one or more databases 512 may be accessible by or included within information handling system 500. Hard drive 507 may comprise a database 512a. Super I/O chip 508 may be communicatively coupled to a database 512n either directly or indirectly, wired or wirelessly. In one or more embodiments, database 512 may be internal (for example, as part of hard drive 507), external or both to information handling system 500.

In one or more embodiments an automated pressure control system comprises a plurality of pumping systems, wherein the plurality of pumping systems pump a fluid to a wellhead and a control system coupled to the plurality of pumping systems, wherein the control system comprises a processor and a non-transitory memory, wherein the non-transitory memory stores one or more instructions that when executed by the processor, cause the processor to determine that a triggering event has occurred based, at least in part, on the one or more operational parameters, determine the mitigation step based, at least in part, on the one or more operational parameters, and initiate the mitigation step, wherein initiating the mitigation step comprises identifying at least one pumping system of the plurality pumping systems based, at least in part, on the one or more operational parameters and selectively altering an operational state of the at least one pumping system. In one or more embodiments, the automated pressure control system further comprises initiating the mitigation step further comprises that initiating the mitigation step further comprises resuming operation of the at least one pumping system. In one or more embodiments, the automated pressure control system further comprises that the one or more operational parameters are received at a control system coupled to the plurality of pumping systems, wherein the control system controls operation of the plurality of pumping systems. In one or more embodiments, the one or more instructions that when executed by the processor, further cause the processor to receive at a master control system the one or more operational parameters from the control system, assess a total energy associated with the well environment and communicate the mitigation step to the control system. In one or more embodiments, the automated pressure control system further comprises that initiating the mitigation step further comprises resuming operation of the at least one pumping system. In one or more embodiments, the automated pressure control system further comprises that the one or more operational parameters are received at a control system coupled to the plurality of pumping systems, wherein the control system controls operation of the plurality of pumping systems. In one or more embodiments, the automated pressure control system further comprises that selectively altering the operational state of the at least one pumping system comprises at least one of altering an inertia of the at least one pumping system, altering a pressure of the fluid, altering a flow rate of the fluid, and altering a flow path of the fluid.

In one or more embodiments, a method for mitigating a triggering event for a well environment comprises receiving one or more operational parameters associated with a plurality of pumping systems at the well environment, wherein the plurality of pumping systems pump a fluid to a wellhead, determining that the triggering event has occurred based, at least in part, on the one or more operational parameters, determining the mitigation step based, at least in part, on the one or more operational parameters and initiating the mitigation step, wherein initiating the mitigation step comprises identifying at least one pumping system of the plurality pumping systems based, at least in part, on the one or more operational parameters and selectively altering an operational state of the at least one pumping system. In one or more embodiments, the method further comprises that initiating the mitigation step further comprises resuming operation of the at least one pumping system. In one or more embodiments, the method further comprises that the one or more operational parameters are received at a control system coupled to the plurality of pumping systems, wherein the control system controls operation of the plurality of pumping systems. In one or more embodiments, the method further comprises receiving at a master control system the one or more operational parameters from the control system, assessing a total energy associated with the well environment and communicating the mitigation step to the control system. In one or more embodiments, the method further comprises that the one or more operational parameters comprise at least one of pump pressure, discharge rate and valve operation associated with the plurality of pumping systems. In one or more embodiments, the method further comprises that at least one of the one or more operational parameters is associated with at least one of a transmission, a relief valve and a wellhead. In one or more embodiments, the method further comprises that selectively altering the operational state of the at least one pumping system comprises at least one of altering an inertia of the at least one pumping system, altering a pressure of the fluid, altering a flow rate of the fluid, and altering a flow path of the fluid.

In one or more embodiments, a non-transitory computer readable medium storing one or more instructions that, when executed by a processor, cause the processor to receive one or more operational parameters associated with a plurality of pumping systems at a well environment, wherein the plurality of pumping systems pump a fluid to a wellhead, determine that a triggering event has occurred based, at least in part, on the one or more operational parameters, determine the mitigation step based, at least in part, on the one or more operational parameters and initiate the mitigation step, wherein initiating the mitigation step comprises identifying at least one pumping system of the plurality pumping systems based, at least in part, on the one or more operational parameters and selectively alter an operational state of the at least one pumping system. In one or more embodiments of the non-transitory computer readable medium, the initiating the mitigation step further comprises resuming operation of the at least one pumping system. In one or more embodiments of the non-transitory computer readable medium, the one or more operational parameters are received at a control system coupled to the plurality of pumping systems, wherein the control system controls operation of the plurality of pumping systems. In one or more embodiments, the one or more instructions, when executed, further cause the processor to receive at a master control system the one or more operational parameters from the control system, assess a total energy associated with the well environment; and communicate the mitigation step to the control system. In one or more embodiments of the non-transitory computer readable medium, the initiating the mitigation step further comprises resuming operation of the at least one pumping system. In one or more embodiments of the non-transitory computer readable medium, the selectively altering the operational state of the at least one pumping system comprises at least one of altering an inertia of the at least one pumping system, altering a pressure of the fluid, altering a flow rate of the fluid, and altering a flow path of the fluid.

The particular embodiments disclosed above are illustrative only, as the present disclosure may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present disclosure. Also, the terms in the claims have their plain, ordinary meaning unless otherwise explicitly and clearly defined by the patentee.

What is claimed is:

1. A well pumping system, comprising:
a plurality of pumping systems, wherein the plurality of pumping systems pump a fluid to a wellhead; and
a control system coupled to the plurality of pumping systems, wherein the control system comprises:
a processor; and
a non-transitory memory, wherein the non-transitory memory stores one or more instructions that when executed by the processor, cause the processor to:
receive one or more operational parameters associated with the plurality of pumping systems at the well environment;
determine that a triggering event has occurred based, at least in part, on the one or more operational parameters; and
initiate a mitigation step in response to the triggering event, wherein initiating the mitigation step comprises:
(a) altering an operational state of a selected one or more of the plurality of pumping systems to decrease an energy of the selected one or more of the plurality of pumping systems, comprising:
engaging a transmission disconnect between a motor and a pump of the selected one or more of the plurality of pumping systems and opening a valve value; or
(b) altering an operational state of a selected one or more of the plurality of pumping systems without decreasing the energy of the selected one or more of the plurality of pumping systems, comprising:
initiating a power down sequence to the motor of the selected one or more of the plurality of pumping systems and opening a pressure relief valve.

2. The system of claim 1, wherein the one or more instructions that when executed by the processor, further cause the processor to resume operation of the selected one or more of the plurality of pumping systems.

3. The system of claim 1, wherein the control system controls operation of the plurality of pumping systems.

4. The system of claim 1, wherein (a) altering the operational state of the selected one or more of the plurality of pumping systems to decrease an energy of the selected one or more of the plurality of pumping systems further comprises altering a pressure of the fluid or altering a flow path of the fluid.

5. The system of claim 1, wherein the one or more operational parameters comprise at least one of pump pressure, discharge rate and valve operation associated with the plurality of pumping systems.

6. The system of claim 1, wherein at least one of the one or more operational parameters is associated with at least one of a transmission, the pressure relief valve and the wellhead.

7. The method of claim 1, wherein the triggering event comprises an overpressure event.

8. The method of claim 1, wherein the energy of the pumping system comprises the energy stored in the inertia of a rotor of the motor of the selected one or more of the plurality of pumping systems.

9. A method for mitigating a triggering event for a well environment, comprising:
receiving one or more operational parameters associated with a plurality of pumping systems at the well environment, wherein the plurality of pumping systems pump a fluid to a wellhead;
determining that the triggering event has occurred based, at least in part, on the one or more operational parameters; and
initiating a mitigation step in response to the triggering event, wherein initiating the mitigation step comprises:
(a) altering an operational state of a selected one or more of the plurality of pumping systems to decrease an energy of the selected one or more of the plurality of pumping systems, comprising:
engaging a transmission disconnect between a motor and a pump of the selected one or more of the plurality of pumping systems and opening a pressure relief valve; or
(b) altering an operational state of a selected one or more of the plurality of pumping systems without decreasing the energy of the selected one or more of the plurality of pumping systems, comprising:
initiating a power down sequence to the motor of the selected one or more of the plurality of pumping systems and opening a pressure relief valve.

10. The method as claimed in claim 9, wherein the one or more instructions that when executed by the processor, further cause the processor to resume operation of the selected one or more of the plurality of pumping systems.

11. The method as claimed in claim 9, wherein the control system controls operation of the plurality of pumping systems.

12. The method as claimed in claim 9, wherein the one or more operational parameters comprise at least one of pump pressure, discharge rate and valve operation associated with the plurality of pumping systems.

13. The method as claimed in claim 9, wherein at least one of the one or more operational parameters is associated with at least one of a transmission, the pressure relief valve and the wellhead.

14. The method as claimed in claim 9, wherein (a) altering the operational state of the selected one or more of the plurality of pumping systems to decrease an energy of the selected one or more of the plurality of pumping systems further comprises altering a pressure of the fluid or altering a flow path of the fluid.

15. The method of claim 9, wherein the triggering event comprises an overpressure event.

16. The method of claim 9, wherein the energy of the pumping system comprises the energy stored in the inertia of a rotor of the motor of the selected one or more of the plurality of pumping systems.

17. A non-transitory computer readable medium storing one or more instructions that, when executed by a processor, cause the processor to:
receive one or more operational parameters associated with a plurality of pumping systems at a well environment, wherein the plurality of pumping systems pump a fluid to a wellhead;
determine that a triggering event has occurred based, at least in part, on the one or more operational parameters; and
initiate the mitigation step in response to the triggering event, wherein initiating the mitigation step comprises:
opening a pressure relief valve or diverting flow of the fluid; and
(a) altering an operational state of a selected one or more of the plurality of pumping systems by decreasing the energy of the selected one or more of the plurality of pumping systems, comprising:
engaging a transmission disconnect between a motor and a pump of the selected one or more of the plurality of pumping systems; or
(b) altering an operational state of a selected one or more of the plurality of pumping systems without decreasing the energy of the selected one or more of the plurality of pumping systems, comprising:
initiating a power down sequence to the motor of the selected one or more of the plurality of pumping systems.

18. The non-transitory computer readable medium of claim 17, wherein the one or more instructions that when executed by the processor, further cause the processor to resume operation of the selected one or more of the plurality of pumping systems.

19. The non-transitory computer readable medium of claim 17, wherein the one or more instructions cause the processor to receive the one or more operational parameters at a control system coupled to the plurality of pumping systems, wherein the control system controls operation of the plurality of pumping systems.

20. The non-transitory computer readable medium of claim 17, wherein selectively altering the operational state of the selected one or more of the plurality of pumping systems to decrease an energy of the selected one or more of the plurality of pumping systems further comprises altering a pressure of the fluid, altering a flow rate of the fluid, altering a flow path of the fluid, or combinations thereof.

21. The non-transitory computer readable medium of claim 17, wherein the one or more operational parameters comprise at least one of pump pressure, discharge rate and valve operation associated with the plurality of pumping systems.

22. The non-transitory computer readable medium of claim 17, wherein at least one of the one or more operational parameters is associated with at least one of a transmission, the pressure relief valve and the wellhead.

23. The method of claim 17, wherein the energy of the pumping system comprises the energy stored in the inertia of a rotor of the motor of the selected one or more of the plurality of pumping systems.

* * * * *